United States Patent Office 3,708,592
Patented Jan. 2, 1973

3,708,592
2,4-DIHYDRO - 6 - PHENYL-1H-s-TRIAZOLO[4,3-a]
[1,4]BENZODIAZEPIN - 1 - ONE COMPOSITIONS
AND METHOD OF TREATMENT
Jackson B. Hester, Jr., Galesburg, Mich., assignor to The
Upjohn Company, Kalamazoo, Mich.
No Drawing. Continuation-in-part of application Ser. No.
852,112, Aug. 21, 1969, now Patent No. 3,646,055,
dated Feb. 29, 1972. This application Nov. 18, 1971,
Ser. No. 200,202
Int. Cl. A61k 27/00
U.S. Cl. 424—269                 17 Claims

ABSTRACT OF THE DISCLOSURE

Therapeutic compositions for treating humans and animals comprising, in dosage unit form a 2,4-dihydro-6-phenyl-1H-s-triazolo[4,3-a][1,4]benzodiazepin - 1 - one compound of the formula:

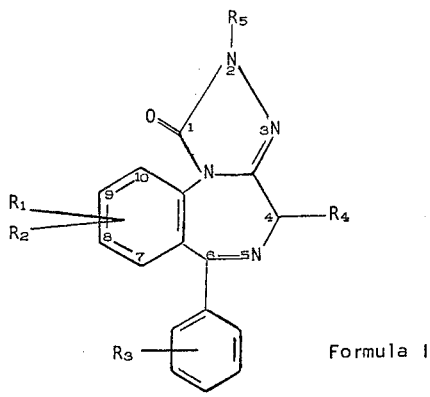

Formula I wherein $R_1$, $R_2$, and $R_3$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, alkanoylamino and dialkylamino, in which the carbon chain moieties are of 1 to 3 carbon atoms, inclusive, and wherein $R_4$ and $R_5$ are selected from the group consisting of hydrogen and alkyl of from 1 to 3 carbon atoms including the pharmacologically acceptable acid addition salts thereof in combination with a pharmaceutical carrier. The compositions have CNS depressant activity and are useful as tranquilizers, e.g., to reduce anxiety. The compositions are also useful as sedatives, hypnotics, muscle relaxants and anticonvulsants. The compositions can be administered to human or animal subjects.

CROSS REFERENCE TO RELATED APPLICATIONS

This application is a continuation-in-part of application Ser. No. 852,112, filed Aug. 21, 1969, now U.S. Pat. No. 3,646,055 issued Feb. 29, 1972.

BRIEF SUMMARY OF THE INVENTION

This invention is a therapeutic composition for treating humans and animals comprising a benzodiazepine of the Formula I and including the pharmacologically acceptable acid addition salts thereof in combination with a pharmaceutical carrier and a method for treatment.

DETAILED DESCRIPTION

The compounds of the Formula I can be prepared by methods disclosed in copending application Ser. No. 852,112, filed Aug. 21, 1969, and as shown hereafter.

Preparation 1.—2,4-dihydro-8-chloro-6-(o-chloro phenyl)-1H-s-triazolo[4,3-a][1,4]benzodiazepin-1-one

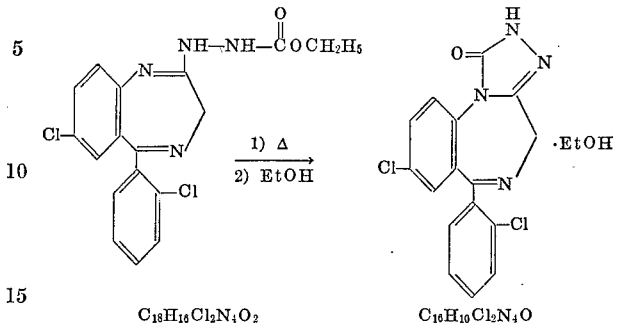

$C_{18}H_{15}Cl_2N_4O_2$                $C_{16}H_{10}Cl_2N_4O$

Carbazic acid - 3 - [7-chloro-5-(o-chlorophenyl)-3H-1,4-benzodiazepin-2-yl] ethyl ester (3.5 g., 0.01 mole) was heated under $N_2$ at 225–230° C. for 30 minutes. The cooled melt was crystallized from abs. EtOH (75 ml.) to give 2.5 g. (80%) of white crystals, M.P. 204–205°. The IR and NMR spectra supported the proposed structure.

Analysis.—Calcd. for $C_{16}H_{10}Cl_2N_4O$ (percent): C, 55.26; H, 4.12; N, 14.32; Cl, 18.12. Found (percent): C, 54.79; H, 4.05; N, 14.47; Cl, 18.34.

Preparation 2.—2,4 - dihydro - 8 - chloro-2-methyl-6-(o-chlorophenyl)-1H-s-triazolo[4,3-a][1,4]benzodiazepin-1-one and its hydrochloride A solution of 1.0 g. of 2,4-dihydro-6-phenyl-1H-s-triazol[4,3-a][1,4]benzodiazepin-1-one in 25 ml. of dry dimethylformamide in a nitrogen atmosphere is treated with 0.145 g. of sodium hydride (a 58% suspension of NaH in mineral oil). This mixture is heated on the steam bath for 15 minutes resulting in a solution. This solution is cooled in an ice bath and thereto is added 0.5 g. of methyl iodide in about 5 ml. of ether. After stirring the reaction mixture for 18 hours at about 22–24° C., the mixture is concentrated and the resulting residue chromatographed over 100 g. of silica gel with an ethyl acetate-cyclohexane (in 1:1 by volume ratio) solution. The product is crystallized from ether-Skelly B to give 2,4-dihydro-8 - chloro - 2 - methyl-6-(o-chlorophenyl)-1H-s-triazolo [4,3-a][1,4]benzodiazepin-1-one having a M.P. of 82–84° C. The latter is converted with ethereal hydrogen chloride to its hydrochloride salt.

The compositions of the present invention are presented for administration to humans and animals in unit dosage forms, such as tablets, capsules, pills, powders, granules, sterile parenteral solutions or suspensions, and oral solutions or suspensions, and oil in water and water in oil emulsions containing suitable quantities of the compound of Formula I.

For oral administration either solid or fluid unit dosage forms can be prepared. For preparing solid compositions such as tablets, the compound of Formula I is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. Wafers are prepared in the same manner as tablets, differing only in shape and the inclusion of sucrose or other sweetener and flavor. In their simplest embodiment, capsules, like tablets, are prepared by mixing the compound with an inert pharmaceutical diluent and filling the mixture into a hard gelatin capsule of appropriate size. Soft gelatin capsules are prepared by machine encapsulation of a slurry of the compound with an acceptable vegetable oil, light liquid petrolatum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydro-alcoholic (ethanol) vehicle with suitable sweeteners such as sugar and saccharin, together with an aromatic flavoring agent.

Suspensions can be prepared with a syrup vehicle with the aid of a suspending agent such as acacia, tragacanth, methylcellulose and the like.

For parenteral administration, fluid unit dosage forms are prepared utilizing the compound and a sterile vehicle, water being preferred. The compound, depending on the vehicle and concentration used, can be either suspended or dissolved in the vehicle. In preparing solutions the compound can be dissolved in water for injection and filter sterilized before filling into a suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the liquid prior to use. Parenteral suspensions are prepared in substantially the same manner except that the compound is suspended in the vehicle instead of being dissolved and sterilization cannot be accomplished by filtration. The compound can be sterilized by exposure to ethylene oxide before suspending in the sterile vehicle. Advantageously, a surfactant or wetting agent is included in the composition to facilitate uniform distribution of the compound.

The term unit dosage form, as used in the specification and claims, refers to physically discrete units suitable as unitary dosages for human subjects and animals, each unit containing a predetermined quantity of active material calculated to produce the desired therapeutic effect in association with the required pharmaceutical diluent, carrier, or vehicle. The specifications for the novel unit dosage forms of this invention are dictated by and directly dependent on (a) the unique characteristics of the active material and the particular effect to be achieved, and (b) the limitations inherent in the art of compounding such an active material for use in humans and animals, as disclosed in detail in this specification, these being features of the present invention. Examples of suitable unit dosage forms in accord with this invention are tablets, capsules, pills, suppositories, powder packets, granules, wafers, cachets, teaspoonfuls, tablespoonfuls, dropperfuls, ampuls, vials, segregated multiples of any of the foregoing, and other forms as herein described.

The dosage of the compound for treatment depends on route of administration, the age, weight, and condition of the patient. A dosage schedule of from about 0.1 to 100 mg. in a single dose, embraces the effective range for inducing sleep for which the compositions are effective. The dosage to be administered is calculated on the basis of from about 0.001 to about 1 mg./kg. by weight of subject.

The compound is compounded with a suitable pharmaceutical carrier in unit dosage form for convenient and effective administration. In the preferred embodiments of this invention, the dosage units contain the compound in: 0.1, 0.5, 1, 10, and 50 mg. amounts for systemic treatment, and 0.1% to 5.0% w./v. for parenteral treatment. The dosage of compositions containing a compound of Formula I and one or more other active ingredients is to be determined with reference to the actual dosage of each such ingredient.

In addition to the administration of a compound of Formula I as the principle active ingredient of compositions for treatment of the conditions described herein, the said compound can be combined with other compounds to obtain advantageous combinations of properties.

The following examples are illustrative of the best mode contemplated by the inventor for carrying out his invention and are not to be construed as limiting.

Example 1.—A lot of 10,000 tablets, each containing 0.1 mg. of 8 - chloro - 2,4 - dihydro - 2 - methyl-6-phenyl-1H - s - triazolo - [4,3-a][1,4]benzodiazepin - 1 - one hydrochloride is prepared from the following types and amounts of ingredients:

|  | Gm. |
|---|---|
| 8 - chloro - 2,4 - dihydro - 2 - methyl - 6 - phenyl-1H - s - triazolo[4,3-a][1,4]benzodiazepin-1-one hydrochloride | 1 |
| Dicalcium phosphate | 1,500 |
| Methylcellulose, U.S.P. (15 cps.) | 60 |
| Talc | 150 |
| Corn Starch | 200 |
| Calcium stearate | 12 |

The compound and dicalcium phosphate are mixed well, granulated with 7.5 percent solution of methylcellulose in water, passed through a No. 8 screen and dried carefully. The dried granules are passed through a No. 12 screen, mixed thoroughly with the talc, starch and magnesium stearate, and compressed into tablets.

These tablets are useful in reducing anxiety in children at a dose of 1 to 2 tablets, depending on the age and weight of the patient.

Example 2.—One thousand two-piece hard gelatin capsules, each containing 100 mg. of 8 - chloro - 2,4-dihydro-2 - methyl - 6 - phenyl - 1H - s - triazolo[4,3-a][1,4]benzodiazepin-1-one hydrochloride are prepared from the following types and amounts of ingredients:

|  | Gm. |
|---|---|
| 8 - chloro - 2,4 - dihydro - 2 - methyl - 6 - phenyl-1H - s - triazolo[4,3-a][1,4]benzodiazepin-1-one hydrochloride | 100 |
| Talc | 25 |
| Magnesium stearate | 250 |

The ingredients are mixed well and filled into capsules of the proper size.

Capsules so prepared are useful to reduce anxiety in adults at a dose of one capsule.

Example 3.—One thousand tablets for sublingual use are prepared from the following ingredients:

|  | Gm. |
|---|---|
| 8 - chloro - 2,4 - dihydro - 2 - methyl - 6 - phenyl-1H - s - triazolo[4,3-a][1,4]benzodiazepin - 1-one hydrochloride | 5 |
| Polyethylene glycol 4,000, powdered | 150 |
| Polyethylene glycol 6,000, powdered | 75 |

The ingredients are mixed well and compressed into sublingual-type tablets weighing 226 mg.

These tablets placed under the tongue are useful to reduce anxiety with a rapid induction at a dose of 1 tablet.

Example 4.—Soft gelatin capsules for oral use, each containing 1 mg. of 8 - chloro - 2,4 - dihydro - 2 - methyl-6 - phenyl - 1H - s - triazolo[4,3-a][1,4]benzodiazepin-1-one hydrochloride are prepared by first dispersing the micronized compound in corn oil to render the material capsulatable and then encapsulating in the usual manner.

Example 5.—One thousand tablets, each containing 5 mg. of 8 - chloro - 2,4 - dihydro - 2 - methyl-6-phenyl-1H - s - triazolo[4,3-a][1,4]benzodiazepin-1-one hydrochloride are made from the following types and amounts of ingredients:

|  | Gm. |
|---|---|
| 8 - chloro - 2,4 - dihydro - 2 - methyl - 6 - phenyl-1H - s - triazolo[4,3-a][1,4]benzodiazepin - 1-one hydrochloride | 5 |
| Lactose | 355 |
| Nicrocrystalline cellulose NF | 120 |
| Starch | 16 |
| Magnesium stearate powder | 4 |

The ingredients are screened and blended together and pressed into 500 mg. tablets.

The tablets are useful to produce tranquilization.

Example 6.—A sterile preparation suitable for intramuscular injection and containing 1 mg. of 8 - chloro-2,4-dihydro - 2 - methyl - 1H - s - triazolo[4,3-a][1,4]benzodiazepin-1-one hydrochloride in each milliliter is prepared from the following ingredients:

| | Gm. |
|---|---|
| 8 - chloro - 2,4 - dihydro - 2 - methyl - 6 - phenyl-1H - s - triazolo[4,3-a][1,4]benzodiazepin-1-one hydrochloride _____ gm__ | 1 |
| Benzyl benzoate _____ ml__ | 200 |
| Methylparaben _____ gm__ | 1.5 |
| Propylparaben _____ gm__ | 0.5 |
| Cottonseed oil q.s. 1,000 ml. | |

One milliliter of this sterile preparation is injected to reduce anxiety in adults before surgical procedure.

Example 7.—Following the procedure of the preceding Examples 1 through 6 inclusive, unit dosage forms are similarly prepared substituting an equal amount each of 2,4-dihydro-6-phenyl-8-chloro-1H-s-triazolo[4,3-a][1,4]-benzodiazepin-1-one;

2,4-dihydro-4-methyl-6-(o-chlorophenyl)-8-chloro-1H-s-triazolo[4,3-a][1,4]benzodiazepin-1-one;

2,4-dihydro-2,4-dimethyl-6-(o-chlorophenyl)-8-chloro-1H-s-triazolo[4,3-a][1,4]benzodiazepin-1-one;

2,4-dihydro-2-methyl-6-(o-chlorophenyl)-8-chloro-1H-s-triazolo[4,3-a][1,4]benzodiazepin-1-one;

2,4-dihydro-6-(o-chlorophenyl)-8-chloro-1H-s-triazolo-[4,3-a][1,4]benzodiazepin-1-one for the 2,4-dihydro-2-methyl-6-phenyl-8-chloro-1H-s-triazolo[4,3-a][1,4]benzodiazepin-1-one.

I claim:

1. A pharmaceutical composition comprising, in unit dosage form, from about 0.1 mg. to about 100 mg. of a compound of the formula

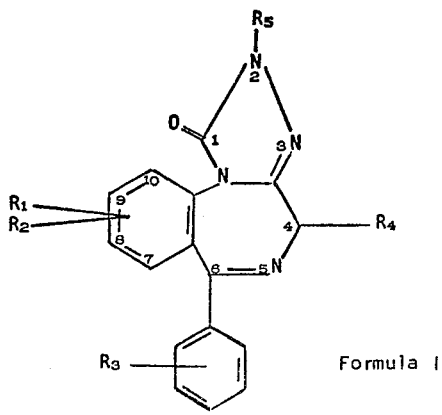

Formula I wherein $R_1$, $R_2$, and $R_3$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, alkanoylamino and dialkylamino, in which the carbon chain moieties are of 1 to 3 carbon atoms, inclusive, and wherein $R_4$ and $R_5$ are selected from the group consisting of hydrogen and alkyl of from 1 to 3 carbon atoms or the pharmacologically acceptable acid addition salts thereof in association with a pharmaceutical carrier.

2. The composition of claim 1 wherein the compound is 2,4 - dihydro-6-phenyl-8-chloro-1H-s-triazolo[4,3-a][1,4]benzodiazepin-1-one.

3. The composition of claim 1 wherein the compound is 2,4 - dihydro - 2 - methyl-6-phenyl-8-chloro-1H-s-triazolo-[4,3-a][1,4]benzodiazepin-1-one.

4. The composition of claim 1 wherein the compound is 2,4 - dihydro - 4 - methyl-6-(o-chlorophenyl)-8-chloro-1H-s-triazolo[4,3-a][1,4]benzodiazepin-1-one.

5. The composition of claim 1 wherein the compound is 2,4 - dihydro - 2,4 - dimethyl-6-(o-chlorophenyl)-8-chloro-1H-s-triazolo[4,3-a][1,4]benzodiazepin-1-one.

6. The composition of claim 1 wherein the compound is 2,4 - dihydro - 2 - methyl-6-(o-chlorophenyl)-8-chloro-1H-s-triazolo[4,3-a][1,4]benzodiazepin-1-one.

7. The composition of claim 1 wherein the compound is 2,4 - dihydro - 6 - (o-chlorophenyl)-8-chloro-1H-s-triazolo[4,3-a][1,4]benzodiazepin-1-one ethanol solvate.

8. The composition of claim 1 wherein the compound is 2,4 - dihydro-2-methyl-6-methyl-8-chloro-1H-s-triazolo-[4,3-a][1,4]benzodiazepin-1-one hydrochloride.

9. A process for reducing anxiety comprising the administration to a human or animal subject a tranquilizing amount of a compound of the formula:

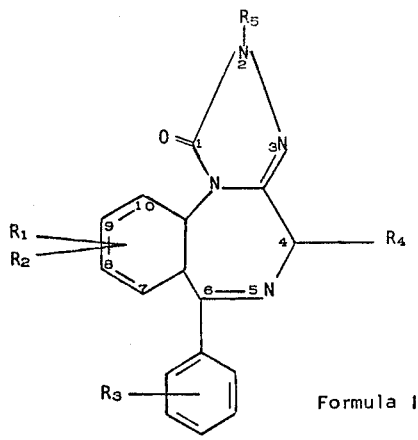

Formula I wherein $R_1$, $R_2$, and $R_3$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, alkanoylamino and dialkylamino, in which the carbon chain moieties are of 1 to 3 carbon atoms, inclusive, and wherein $R_4$ and $R_5$ are selected from the group consisting of hydrogen and alkyl of from 1 to 3 carbon atoms in association with a pharmaceutical carrier.

10. The process of claim 9 wherein from about 0.1 to about 100 mg. of the compound is administered.

11. The process of claim 9 wherein the compound is 2,4 - dihydro - 6 - phenyl - 8 - chloro-1H-s-triazolo[4,3-a][1,4]benzodiazepin-1-one and the amount administered is from about 0.1 to about 100 mg.

12. The process of claim 9 wherein the compound is 2,4- dihydro - 2 - methyl-6-phenyl-8-chloro-1H-s-triazolo-[4,3-a][1,4]benzodiazepin-1-one and the amount administered is from about 0.1 to about 100 mg.

13. The process of claim 9 wherein the compound is 2,4 - dihydro - 4 - methyl - 6 - (o-chlorophenyl)-8-chloro-1H-s-triazolo[4,3-a][1,4]benzodiazepin - 1 - one and the amount administered is from about 0.1 to about 100 mg.

14. The process of claim 9 wherein the compound is 2,4 - dihydro - 2,4-dimethyl-6-(o-chlorophenyl)-8-chloro-1H-s-triazolo[4,3-a][1,4]benzodiazepin - 1 - one and the amount administered is from about 0.1 to about 100 mg.

15. The process of claim 9 wherein the compound is 2,4 - dihydro - 2 - methyl - 6 - (o-chlorophenyl)-8-chloro-1H-s-triazolo[4,3-a][1,4]benzodiazepin - 1 - one and the amount administered is from about 0.1 to about 100 mg.

16. The process of claim 9 wherein the compound is 2,4 - dihydro - 6 - (o-chlorophenyl) - 8 - chloro - 1H-s-triazolo[4,3-a][1,4]benzodiazepin-1-one ethanol solvate and the amount administered is from about 0.1 to about 100 mg.

17. The process of claim 9 wherein the compound is 2,4 - dihydro - 2 - methyl - 6 - phenyl-8-chloro-1H-s-triazolo[4,3-a][1,4]benzodiazepin-1-one hydrochloride and the amount administered is from about 0.1 to about 100 mg.

References Cited

UNITED STATES PATENTS 3,422,091  1/1969  Archer et al. _____ 260—239

STANLEY J. FRIEDMAN, Primary Examiner